United States Patent
Liaw et al.

(10) Patent No.: US 7,249,167 B1
(45) Date of Patent: Jul. 24, 2007

(54) INTELLIGENT MODULAR SERVER MANAGEMENT SYSTEM FOR SELECTIVELY OPERATING A PLURALITY OF COMPUTERS

(75) Inventors: Yee S. Liaw, Warren, NJ (US); Lee Glinski, Lake Hopatcong, NJ (US); Alex Lee, Ying Kuo (TW)

(73) Assignee: Raritan, Inc., Somerset, NJ (US)

( * ) Notice: Subject to any disclaimer, the term of this patent is extended or adjusted under 35 U.S.C. 154(b) by 428 days.

(21) Appl. No.: 09/709,759

(22) Filed: Nov. 9, 2000

(51) Int. Cl.
*G06F 15/16* (2006.01)

(52) U.S. Cl. .......................... 709/218; 710/38; 710/51; 710/64; 710/73

(58) Field of Classification Search ................ 345/168; 710/62, 73, 100, 64, 38, 51; 709/219; 700/19
See application file for complete search history.

(56) References Cited

U.S. PATENT DOCUMENTS

| | | | |
|---|---|---|---|
| 5,257,390 A | 10/1993 | Asprey | |
| 5,268,676 A | 12/1993 | Asprey et al. | |
| 5,353,409 A | 10/1994 | Asprey et al. | |
| 5,721,842 A | 2/1998 | Beasley et al. | |
| 5,732,212 A | 3/1998 | Perholtz et al. | |
| 5,884,096 A | 3/1999 | Beasley et al. | |
| 5,937,176 A | 8/1999 | Beasley et al. | |
| 5,978,389 A | 11/1999 | Chen | |
| 6,112,264 A | 8/2000 | Beasley et al. | |
| 6,119,148 A | 9/2000 | Chen | |
| 6,138,191 A | 10/2000 | Fujii et al. | |
| 6,345,323 B1 | 2/2002 | Beasley et al. | |
| 6,378,009 B1 | 4/2002 | Pinkston, II et al. | |
| 6,378,014 B1* | 4/2002 | Shirley | 710/100 |
| 6,385,666 B1 | 5/2002 | Thornton et al. | |
| 6,388,658 B1* | 5/2002 | Ahern et al. | 345/168 |
| 6,557,170 B1 | 4/2003 | Wilder et al. | |
| 6,609,034 B1* | 8/2003 | Behrens et al. | 700/19 |
| 6,618,774 B1* | 9/2003 | Dickens et al. | 710/64 |
| 6,633,905 B1* | 10/2003 | Anderson et al. | 709/219 |
| 6,654,816 B1* | 11/2003 | Zaudtke et al. | 710/1 |
| 6,671,756 B1* | 12/2003 | Thomas et al. | 710/73 |
| 7,028,133 B1* | 4/2006 | Jackson | 710/313 |

* cited by examiner

*Primary Examiner*—Nathan J. Flynn
*Assistant Examiner*—Dustin Nguyen

(57) ABSTRACT

An intelligent, modular server management system for coupling a series of remotely located computers to one or more user stations allowing for selective access of the remotely located computers. A centralized computer matrix switching system is provided to enable a computer user station to access and operate a remotely located computer in a stable environment and transmit analog signals through the switching system over an extended range. The centralized computer matrix switching system receives the input from the computer user station or the remotely located computer, including the keyboard, video monitor and mouse signals, and transmits the signals as though the computer user station was directly coupled to the remotely located computer.

20 Claims, 10 Drawing Sheets

| 502 | 504 | 504 | 504 | 504 | 504 |

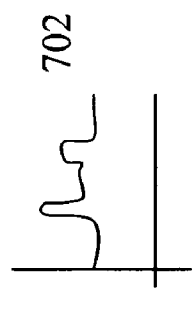
FIG.7A
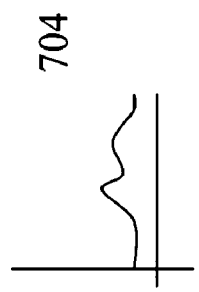
FIG.7B
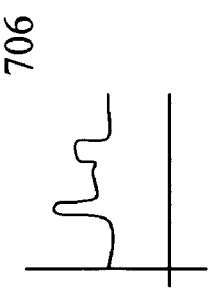
FIG.7C
FIG.7

INTELLIGENT MODULAR SERVER MANAGEMENT SYSTEM FOR SELECTIVELY OPERATING A PLURALITY OF COMPUTERS

FIELD OF THE INVENTION

The present invention relates generally to a server management system for coupling a series of remote computers to one or more user consoles allowing for selective access of remotely located computers whereby the one or more user consoles may remotely access and operate a series of remotely located computers through the user console's keyboard, video monitor and mouse.

BACKGROUND OF THE INVENTION

In a typical computer environment, a Local Area Network (LAN) allows for several computer servers to be connected to provide the resources of each server to the other connected computers. In this system, a dedicated keyboard, video monitor and mouse is employed for each computer server.

In order to operate properly, the system administrator must perform the task of maintaining and monitoring the computer systems. However, the system administrator is frequently required to perform numerous tasks from each individual user console. For example, in order to reboot a computer or add and delete files, a system administrator is often required to operate computer user consoles which may be located at substantial distances from one another. Therefore, in order to accomplish the task of system administration, the system administrator must physically relocate in order to access the remotely located computer consoles. Alternatively, the system administrator may run dedicated cables for each remotely located computer user console to fully access and operate the user consoles which may be located at great distances from the system administrator's user console. Such an alternative needs substantial wiring requirements and wire harnessing requirements at tremendous costs. As the distance between user consoles and remotely located computers increases, loss in signal transmission quality often results. Thus, increased distances between direct wired user consoles and remotely located computers is often impossible. Therefore, a computer system allowing one user station to remotely access and operate another user console is often costly and not very effective.

In addition, in many computer environments, including large-scale operations such as data-centers, server-farms, web-hosting facilities, and call-centers, space to locate all of the computer hardware becomes an important concern. For example, in order to operate a computer environment which requires multiple computers, enough space must be available to house a computer bus, a video monitor, a computer keyboard and a computer mouse, in addition to all of the wiring and power requirements for each computer user console required. Furthermore, space for the wiring interfaces for each computer is required. As more computers are added to the computer network environment, the space requirements will frequently exceed the space allotted for the operation. Therefore, the architecture, size and space limitations become an important issue for planning an effective computer work environment.

In order to reduce the space required in a multiple computer workplace, many network administrators have attempted to eliminate several pieces of computer hardware (i.e., dedicated keyboard, video monitor and mouse) which become superfluous. It is also desirable to eliminate the wiring installations associated with the excess hardware. For example, a network administrator desires to access all of the remotely located computers from a single user console consisting of a complete computer (computer bus, keyboard, video monitor and mouse). However, if the administrator was able to access the remotely located computers from one user console, the remotely located computers would no longer require the external hardware (i.e., the keyboard, video monitor and mouse). Furthermore, eliminating the use of the remotely located computer's keyboard, video monitor and mouse, in effect increases available space.

Asprey U.S. Pat. No. 5,257,390 and Duo U.S. Pat. No. 6,137,455 disclose an extended range communications link having a first signal conditioning network located near and coupled to a computer. The network conditions the keyboard, video monitor and mouse signals. Conditioning of the video signals includes reducing their amplitude so the video signals do not significantly cause induced "crosstalk" in conductors adjacent to the video conductors. An extended range cable having a plurality of conductors is coupled to a signal conditioning circuit and conveys the conditioned, above-named signals, in addition to power and logic ground potentials, to a second signal conditioning network. The network restores the analog video signals to their original levels by reducing induced noise. Furthermore, Duo discloses an encoding system whereby the horizontal synchronizing and vertical synchronizing signals are encoded and transmitted through one single video line. However, Asprey and Duo fail to disclose a computer switching system thereby allowing one or more user work stations to access and operate multiple remotely located computers. Further, Asprey and Duo fail to provide an intelligent server management system with a centralized switching component which provides for reduced space consumption for linking multiple computer systems.

Asprey U.S. Pat. No. 5,268,676 discloses a communications link for up to three hundred feet for use between a computer and display unit. An encoder receives analog Red, Green and Blue signals from the computer and applies them to discrete current amplifiers that modulate signal current applied to discrete conductors of a three hundred foot cable. Impedance matching networks match the Red, Green and Blue signals to the characteristic impedance of the cable. The Red, Green and Blue signals are received near the monitor, and coupled to discrete emitter-follower transistors, which amplify the current of the signals prior to inputting the signals to the monitor. The horizontal sync signal is applied to a conductor of the cable without impedance matching, allowing the conductor to attenuate the horizontal sync signal and reduce noise radiation. However, Asprey fails to disclose a computer switching system that allows one or more user work stations to access and operate a plurality of remotely located computers while maintaining the desired signal strength over an increased distance. Further, Asprey fails to provide an intelligent server management system with a centralized switching component which provides for reduced space consumption for linking multiple computer systems.

Asprey U.S. Pat. No. 5,353,409 discloses a circuitry for extending Transistor/Transistor/Logic signals from a computer to a remotely located monitor and keyboard. The system uses a first signal conditioning circuit proximate the computer to generally reduce amplitude of the video signals and bias them to a selected potential, after which, the signals are applied to discrete conductors of an extended cable. Asprey further discloses a extended range cabling of up to one thousand feet. A second signal conditioning circuit at the monitor and keyboard end of the cable receives the attenuated signals and utilizes a threshold or pair of thresholds to effect reconstruction of the video signals prior to inputting them to the monitor. Amplitude reduction or attenuation of the video signals generally reduces high frequency video noise appearing on the keyboard clock conductor of the cable, preventing keyboard errors. However, Asprey fails to disclose an intelligent, modular server management system which enables several simultaneous users to operate and control remotely located computers. Furthermore, Asprey discloses an invention for extending the separation of a single computer bus from the video monitor and the keyboard instead of providing a system whereby the keyboard, video monitor and mouse signals are transmitted to multiple computer user consoles. In addition, Asprey fails to disclose a switching system whereby one or more computers can access a plurality of remotely located computers over an extended range. Asprey also fails to disclose an enhanced automatic tuning system which conditions and amplifies the signals continuously.

Chen U.S. Pat. No. 5,978,389 discloses a multiplex device for monitoring computer video signals and receiving as input the video signals of a plurality of computers. The multiplex device selects the video signals of one of the plurality of computers to be inputted into a monitor for monitoring. The multiplex device for monitoring the computer video signals has three sets of switch circuits, a control signal generating circuit, three sets of voltage amplifying circuits, three sets of current amplifying circuits, a synchronous signal multiplex selecting circuit, and an interface circuit. However, Chen does not disclose a switching mechanism whereby the keyboard, video monitor and mouse signals from one user station may be coupled to another remotely located computer thereby allowing the user station to access and operate the remotely located computer.

Beasley U.S. Pat. No. 6,112,264 discloses a computerized switching system for coupling a workstation to a remotely located computer. A signal conditioning unit receives keyboard and mouse signals from a workstation and generates a data packet which is transmitted to a central cross point switch. The packet is routed through the cross point switch to another signal conditioning unit located at a remotely located computer. The second signal conditioning unit applies the keyboard and mouse commands to the keyboard and mouse connectors of the computer as if the keyboard and mouse were directly coupled to the remote computer. Video signals produced by the remote computer are transmitted through the cross point switch to the workstation. Horizontal and vertical sync signals are encoded on to the video signals to reduce the number of cables that extend between the workstation and the remote computer. The signal conditioning units connected to the workstations include an on-screen programming unit that produces menus for the user on a video display of the workstation. Beasley fails to disclose a switching mechanism which provides a reduced size due to condensed wiring infrastructure. Furthermore, Beasley fails to disclose the use of a single Category 5 UTP cable for connecting the system components and an automatic amplification means for routing a tuned signal.

Chen U.S. Pat. No. 6,119,148 discloses a computer video signal distributor. The distributor receives computer video signals inputs and processes and distributes the video signals to a plurality of monitors. The computer video signal distributor includes three transistor common based voltage amplifying circuits for inputting Red, Green and Blue video signals of the computer respectively, and amplifies these video signals for outputting. A synchronous signal buffering device is provided for receiving synchronous signals of the computer, and generating a plurality of sets of synchronous signals according to the number of the monitors. A plurality of monitor input interfaces are provided for receiving the video outputs of the three sets of current amplifying circuits, and receiving the plurality of sets of synchronous signals from the synchronous buffering device, then outputting respectively to the monitors. However, Chen does not disclose a switching mechanism for coupling a series of remote computers to one or more user stations allowing for selective access of the remote computers. Furthermore, Chen does not disclose a centralized computer switching system for enabling a computer user station to access and operate a remote computer in a stable environment while transmitting analog signals through the switching system over an extended range.

Fujii, et al. U.S. Pat. No. 6,138,191 discloses an apparatus for selectively operating a plurality of computers connected to a common video monitor, including a single data I/P device for inputting data and instructions to the plurality of computers, a main control circuit which is connected to the data I/P device, and a selection circuit for selectively providing the data and instructions from the data I/P device. The main control circuit outputs a computer selection signal to select one of the plurality of computers to which the I/P data and instructions are to be transmitted and a video selection signal to select the video output of the selected computer to allow display on the common video monitor. Fujii does not disclose a multi-user, multi-computer system. Fujii discloses a computer system wherein several computers are able to access one common video monitor. However, Fujii does not provide a system which allows for the interfacing of several computers to one or more user stations wherein the keyboard, video monitor and mouse electronic signals are transmitted through a centrally-located switching circuit. Fujii fails to provide a simplified architecture for coupling a plurality of computers to one or more user stations. Furthermore, Fujii does not disclose an apparatus which eliminates the need for expensive cabling.

In view of the foregoing, clearly there exists a need for an improved, modular centralized computer switching system which is reliable and efficient that scales down the need for expensive and space-consuming external computer hardware while maintaining the use of multiple remotely located computers. In addition, it remains a requirement in the art to provide a usable modular computer switching system for allowing one or more user stations to remotely access one or more remotely located computers which allows the user station's keyboard, video monitor and mouse electronic inputs to operate one or more remotely located computers from one or more user consoles. Furthermore, it is a requirement in the art to greatly enhance the ability for information technology personnel to manage the volume of servers for both small-scale computer centers and large-scale operations such as data-centers, server-farms, web-hosting facilities, and call-centers, while providing a small-scale centrally located switching system.

SUMMARY OF THE INVENTION

It is often convenient to physically separate one or more computers from their external hardware (i.e., the keyboard, video monitor and mouse) allowing a network user to operate a computer from a remote location. One of the most popular microcomputers in use today is the IBM personal computer family, and its clones made by others, which generally utilize the same or a similar arrangement for interconnecting a keyboard, video monitor and mouse to the computer. There are separate electrical connectors on these computers for mating the interfaces of these devices. Specifically, one interface is available for connecting a video monitor cable, one for connecting a mouse cable and another for connecting a keyboard cable. Generally, these keyboard, video monitor and mouse cables are approximately six feet in length, allowing for limited separation from the actual computer mainframe. Therefore, this typically requires the computer and the computer console to be located in close proximity to one another. In many circumstances it may be desirable to separate the user console station from the actual computer station due to space constraints. However, one skilled in the art can readily appreciate the fact that in separating the external components of a computer from the computer bus, expensive cabling costs may be incurred. In addition, by removing the external components from the computer bus a decrease in the reliability of the computer stations due to "noise" or "crosstalk" may be experienced in the cabling over the increased distances. Furthermore, it has been discovered that by extending the separation of the keyboard, video monitor and mouse from the computer bus at distances greater than fifteen feet, a user may experience a decrease in keyboard and mouse signaling quality. Also, a loss in the video signal transmission frequently occurs resulting in a poor quality video picture for the user. In addition, by extending the range of the components over standard cable an increase in the impedance of the signal transmission occurs resulting in a decrease in the quality of the signal.

In addition to extending the separation of the keyboard, video monitor and mouse from the computer bus, it is convenient in many computer operations to access and operate more than one computer from one or more user stations. Again, this requirement is often due to space limitations, in addition to the need for efficiency in operating one or more computers. Therefore, disclosed is an intelligent, modular switching server management system which provides extended range communications, for one or more user stations with a single keyboard, video monitor and mouse, to remotely access a plurality of remotely located computers.

The present invention provides an intelligent, modular server management system enabling several simultaneous users to access, control, and operate numerous remotely located computers. Disclosed is a computerized switching system that allows a system administrator to remotely access user stations over long distances. Furthermore, the present invention provides access and control to a variety of computer platforms, including, but not limited to a PC, Mac, Sun, DEC, Alpha, RS/6000, HP9000, SGI, USB and ASCII devices.

A centrally located management system is provided that may be connected to at least one user station. The management system comprises a switching system which is modular and utilizes intelligent components. The switching system is an enhanced apparatus which couples multiple remotely located computers to multiple user stations thereby allowing each independent user station to operate and manage the remotely located multiple computers. The remotely located computers may be linked to the user stations through a variety of cabling mechanisms. However, it is disclosed in the present invention that the most efficient means for cabling is the interconnection of the user stations to the remotely located computers with a space-saving and efficient single Category 5 UTP cable or its equivalent.

In order to achieve the desired efficiency while reducing ID costs and promoting space conservation a system must be provided with reduced cabling requirements and system components which are small in size. Therefore, the invention discloses an intelligent, modular server management system with system components that are optimally constructed in order to reduce the size and architecture of the switching components required. Optimal wiring configuration is achieved through the use of a single Category 5 UTP cable throughout the intelligent, modular server management system.

Therefore it is an object of the present invention to provide an improved, modular centralized computer switching system which is reliable and effective for scaling down the need for expensive and space-consuming external computer hardware while maintaining the use of multiple remotely located computers.

Further, it is an object of the present invention to provide a modular computer switching system for allowing one or more user stations to remotely access one or more remotely located computers that permits the user station's keyboard, mouse and video monitor electronic inputs to operate the remotely located computer from the user station.

Furthermore, it is a requirement in the art to provide an enhanced mechanism for information technology personnel to manage the volume of servers for both small-scale computer centers and large-scale operations such as datacenters, server-farms, web-hosting facilities, and call-centers, while providing a small-scale centrally located switching system.

It is still a further object of the present invention to provide a modular server management system which provides simplified installation, operation and system administration.

In addition, it is an object of the present invention to provide a modular server management system which is small in size allowing for decreased space consumption.

Furthermore, it is an object of the present invention to provide a switching system which allows high resolution video management.

Further, it is an object of present invention to provide a modular server management system which offers an improved communications link for multiple computers through an extended range while providing error-free communications.

Further still, it is an object of the present invention to provide a logic driven extended-range communications system for a plurality of computers.

Accordingly, it is an object of the present invention to provide an intelligent, modular server management system which requires a remotely located computer interface which is powered by the individual computer bus.

It is still an object of the present invention to provide a modular server management system for extended range which allows for an enhanced tuning mechanism for amplifying and conditioning signals uniformly throughout the extended range.

Other objects, features and characteristics of the present invention, as well as the methods of operation and functions of the related elements of the invention, and the combination of parts and economies of development and performance, will become more apparent upon consideration of the following detailed descriptions with reference to the accompanying drawings, all of which form a part of this specification.

BRIEF DESCRIPTION OF THE DRAWINGS

A further understanding of the present invention can be obtained by reference to the preferred embodiment set forth in the illustrations of the accompanying drawings. Although the illustrated embodiment is merely exemplary of systems for carrying out the present invention, both the organization, expanded configurations and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 5 is a diagram of a data packet that is routed from the computer interface module to the matrix switching system;

FIG. 7 is a schematic diagram representing signal distortion through a single Category 5 UTP cable at various points through the signal transmission over the extended range. Specifically, FIG. 7A depicts signal distortion at the point of transmission from the remotely located computer. FIG. 7B depicts signal transmission distortion prior to being routed to the user station. Finally, FIG. 7C depicts the restored signal transmission after the conditioning of the signal in the enhanced automatic tuning system;

DETAILED DESCRIPTION OF THE PREFERRED EMBODIMENTS

As required, a detailed illustrative embodiment of the present invention is disclosed herein. However, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Figure 1:
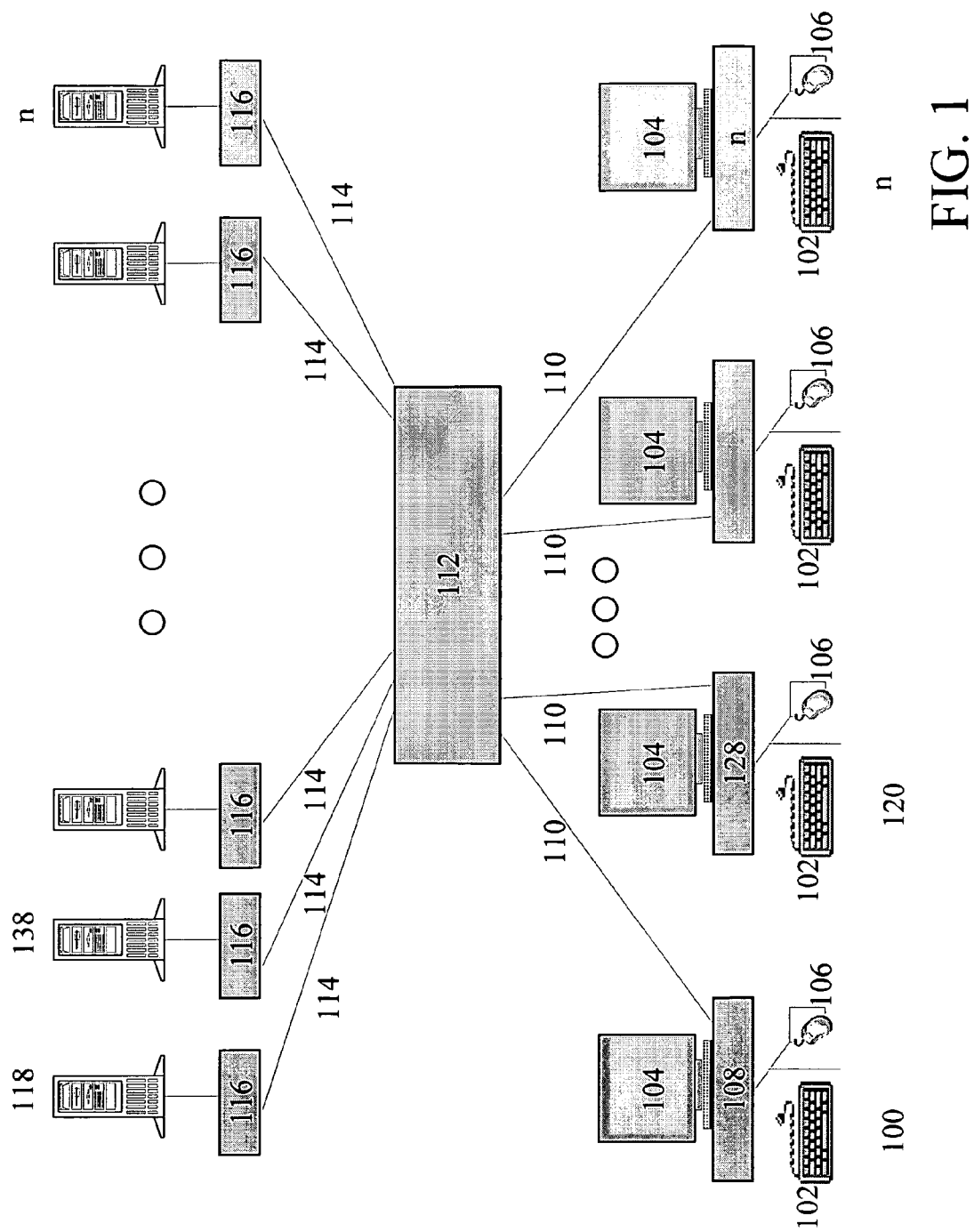
FIG. 1 is a pictorial diagram of the intelligent server management system, according to the present invention, comprising several user stations and remotely located computers interfaced through single Category 5 UTP cables.

Referring first to FIG. 1, depicted is the architecture of the preferred embodiment of the present invention. Specifically, depicted is a modular, intelligent server management system comprising a centrally located matrix switching unit, multiple user stations and remotely located computers interfaced through single Category 5 UTP cables. Although numerous cabling alternatives are recognized in the art, such as co-axial cables, fiber optic cables or the use of multiple Category 5 UTP cables, the inventor has determined that in order to reduce cabling costs while maintaining the desired signal strengths over long distances, a single Category 5 UTP cable is preferred. To achieve the desired objective of maintaining a large-scale computer environment while achieving the desired space constraints, a single Category 5 UTP cable is used to interface the system components. Thus, the invention reduces cabling length and associated costs as compared to the prior art. Although, it is foreseeable to those of ordinary skill in the art that many types of connectors may be utilized in similar systems (i.e., RJ11, RG58, RG59, BNC, ST . . . ), in the preferred embodiment of the present invention standard RJ45 connections are utilized.

In the intelligent, modular server management system, a network user 100 is provided a keyboard 102, a video monitor 104 and a mouse 106. The keyboard 102, video monitor 104 and mouse 106 are independently linked to a user station 108 which provides a connection for a single Category 5 UTP cable 110 to couple each user console 108 (i.e., keyboard, video monitor and mouse connector) to a matrix switching unit 112. Electronic signals from the keyboard, video monitor and mouse are routed through the user station 108 and transmitted to the matrix switching unit 112. To minimize the number of cables required the horizontal and vertical sync signals are encoded onto the video signals (i.e. Red, Green and Blue). The electronic signals from the keyboard, video monitor and mouse are transferred from the matrix switching unit 112 to a computer interface module 116 via a Category 5 UTP cable 114. The computer interface module is coupled to a remotely located computer 118. The computer interface module 116 is compatible with all present day computer systems; however, it is foreseeable that the concepts and disclosed technology of the present invention will also be compatible with those computer systems not yet contemplated. Specifically, the present invention provides access and control to a variety of computer platforms, including, but not limited to a PC, Mac, Sun, DEC, Alpha, RS/6000, HP9000, SGI, USB and ASCII devices.

The use of the Category 5 UTP cable as the cabling for the user station 108 to the switching matrix unit 112 and the switching matrix unit 112 to the computer interface module 116 provides a single cabling alternative. It is known in the art to use multiple cables for each user console (i.e., two unidirectional cables). However, in the present invention the desired signaling requirements are achieved through the use of a single Category 5 UTP cable. The single Category 5 UTP cable provides an effective cabling alternative while still maintaining the desired signal attributes. Thus, the need for expensive cabling is reduced as a single Category 5 UTP cable is utilized in this application. This connection of user station 108 to the matrix switching unit 112 and the matrix switching unit 112 to the computer interface module 116 may be repeated for multiple user stations 108, 128, . . . "n" and multiple remotely located computers 118, 138 . . . "n". Although it is contemplated that "n" may be defined as any integer, in the present embodiment of a standard configuration of the invention it has been established that the matrix switching unit may be expanded to allow for eight user stations and thirty two remotely located computers to achieve the optimum results. Furthermore, in the preferred embodiment, the system may be tiered to allow for thirty two user stations to access and operate up to two thousand forty eight remotely located computers.

In addition, in order to maintain and operate the coupling of the multiple user stations to the multiple remotely located computers provided is an on-screen programming circuit embedded within the modular, intelligent server management system. The programming circuitry provides on-screen menus for the user on the video monitor display of the user station. The on-screen programming system allows for ease in programming and provides information for operating the system. Furthermore, it is foreseeable that multiple security features may be implemented and operated in conjunction with the on-screen programming circuit.

Figure 2:
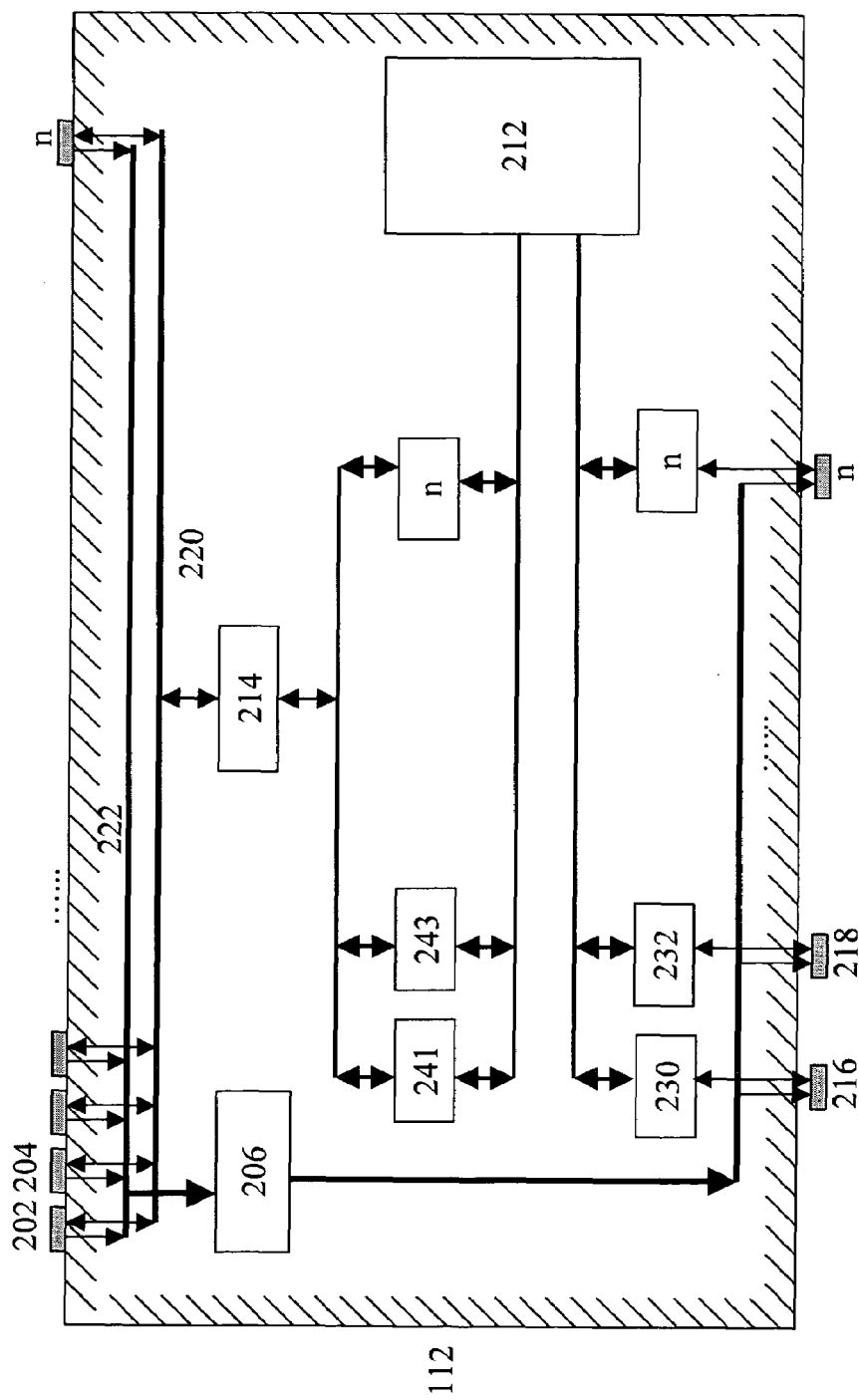
FIG. 2 is a block diagram representing the matrix switching unit of the intelligent server management system of the present invention.

Turning next to FIG. 2, depicted is a block diagram of the matrix switching unit 112. The matrix switching unit 112 enables multiple network users to access and operate multiple remotely located computers. Access to the remotely located computers is provided via the keyboard, video monitor and mouse ports. Access is completely independent of the associated computer network of the computer system. The signal transmissions of the remotely located computers are routed through a computer interface module through a single Category 5 UTP cable to the channel ports 202, 204, . . . "n." The channel ports 202, 204, . . . "n" provide an interface connection for a single Category 5 UTP cable to the matrix switching unit 112. The unidirectional (i.e., remotely located computers to the user station) video monitor signal 222 is routed through the channel ports 202, 204, . . . "n" to a video differential switch 206. The video differential switch 206, including a video driver, provides for high-bandwidth video transmission. The unidirectional video monitor signal 222 is directly routed to a series of user ports 216, 218, . . . "n." The user ports 216, 218, . . . "n" transmit the video monitor signal through a Category 5 UTP cable to the desired user station.

In addition, the channel ports 202, 204, . . . "n" provide an interface connection for the Category 5 UTP cable to the matrix switching unit 112 for the bidirectional keyboard 220 and bidirectional mouse signal 220. The bidirectional keyboard 220 and bidirectional mouse signals 220 are routed through the matrix switching unit 112 to a series of user ports 216, 218, . . . "n" to be routed to the user stations or the remotely located computers via a single Category 5 UTP cable. Specifically, within the matrix switching unit 112, the signals are routed to a switch 214 which routes the signals from the remotely located computers to the desired user station. The bidirectional keyboard 220 and bidirectional mouse signals 220 are then routed to a universal asynchronous receiver transmitter (UART) 241, 243, . . . "n". A plurality of UARTs are provided for each remotely located computer that is linked to the intelligent, modular switching system. The UART 241, 243, . . . "n" acts as a transceiver of the signal transmission for the user stations. From the UART 241, 243, . . . "n" the bidirectional keyboard 220 and bidirectional mouse signals 220 are routed to a computer processing unit (CPU) 212. The CPU 212 interprets the associated command data contained in the bidirectional keyboard 220 and bidirectional mouse signals 220, to effectively route the transmitted bidirectional keyboard 220 and bidirectional mouse signals 220 while controlling the switch 214 to analyze which connected user station will receive the bidirectional keyboard 220 and bidirectional mouse signals 220. The CPU 212 processes the bidirectional keyboard 220 and bidirectional mouse signals 220 and forwards the bidirectional keyboard 220 and bidirectional mouse signals 220 to a second UART 230, 232, . . . "n" which represents the desired user station that is to receive the bidirectional keyboard 220 and bidirectional mouse signals 220. The signal is routed to the desired user port 216, 218, . . . "n" to be transmitted through a Category 5 UTP cable to the desired user station.

Conversely, the bidirectional keyboard 220 and bidirectional mouse signals 220 may be transmitted from the user station to the remotely located computers. For example, bidirectional keyboard 220 and bidirectional mouse signals 220 are transmitted via a Category 5 UTP cable through the user ports 216, 218, . . . "n." The bidirectional keyboard 220 and bidirectional mouse signals 220 are routed through a UART 230, 232, . . . "n" which transmits the bidirectional keyboard 220 and bidirectional mouse signals 220 to a CPU 212. The CPU 212 interprets the associated command data contained in the bidirectional keyboard 220 and bidirectional mouse signals 220 to effectively route the transmitted bidirectional keyboard 220 and bidirectional mouse signals 220. The CPU 212 processes the bidirectional keyboard 220 and bidirectional mouse signals 220 and forwards the bidirectional keyboard 220 and bidirectional mouse signals 220 to a second UART 241, 243, . . . "n" which represents the desired remotely located computer that is to be accessed by the bidirectional keyboard 220 and bidirectional mouse signals 220. The bidirectional keyboard 220 and bidirectional mouse signals 220 are routed to a switch 214 which routes the signals from the user station to the desired remotely located computers. Subsequently, the bidirectional keyboard 220 and bidirectional mouse signals 220 are routed through the desired channel port 202, 204, . . . "n" to be transmitted-via a single Category 5 UTP cable to the desired location.

Figure 3:
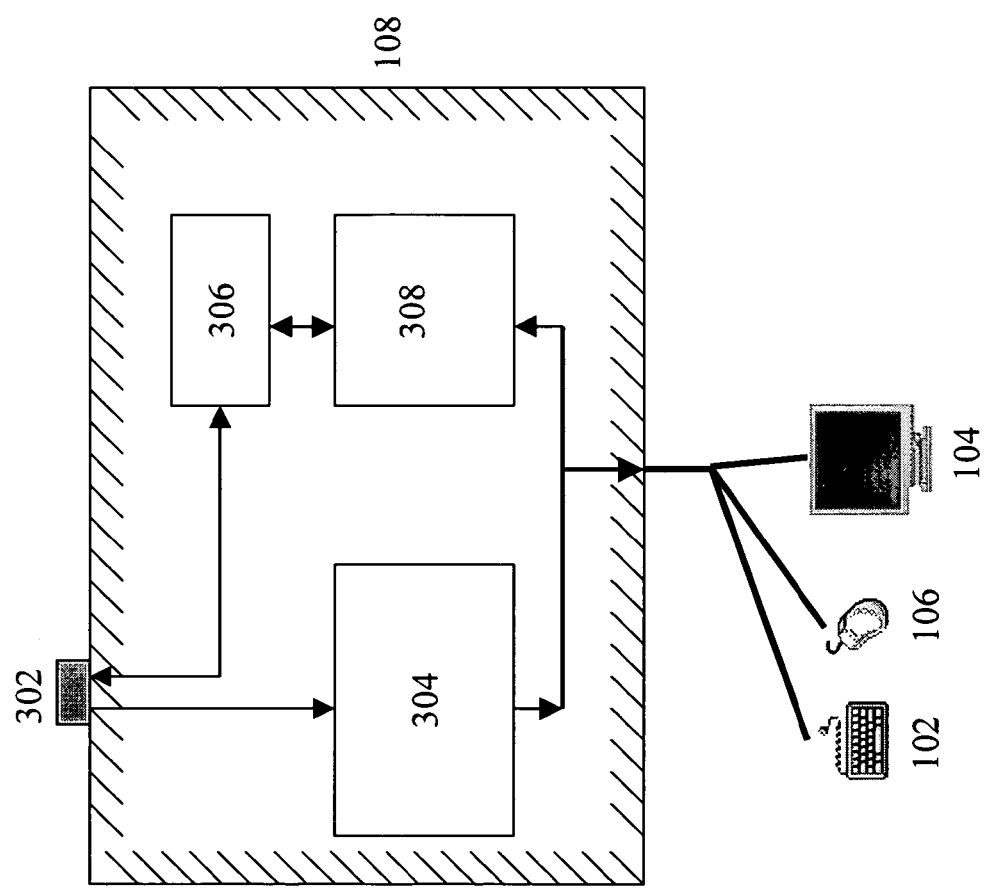
FIG. 3 is a schematic diagram of the user station according to the present invention that codes and routes data between the keyboard, video monitor and mouse of a user console through a single Category 5 UTP cable to the matrix switching unit of the intelligent, modular server management system.

Turning next to FIG. 3, depicted is a schematic diagram of the user station 108 according to the present invention that codes and routes data between the keyboard 102, video monitor 104 and mouse 106 through the Category 5 UTP cable to the matrix switching unit of the intelligent server management system. A network user is provided a keyboard 102, video monitor 104 and mouse 106. The signals from the keyboard 102, video monitor 104 and mouse 106 are independently transmitted to the user station 108. The user station 108 provides for an interface unit which allows for the routing of bidirectional keyboard signals, unidirectional video monitor signals and bidirectional mouse signals to the connected computers. Specifically, keyboard and mouse signals are routed from the network user keyboard 104 and mouse 106 to a CPU 308. The CPU 308 receives the keyboard and mouse signal and attaches a data packet to the transmission. The data packet allows for proper routing of the signal transmission. The keyboard and mouse signals are then routed to a UART 306 to be transmitted through a Category 5 UTP cable port 302 to a single Category 5 UTP cable. Conversely, received keyboard and mouse signals may be routed in the opposite direction through the user station 108 to the network user.

Unidirectional video signals are routed separately through an enhanced auto-tuning mechanism 304. Specifically, video signals are transmitted through a single Category 5 UTP cable to the Category 5 UTP cable port 302 of the user station 108. The video signal is routed to the enhanced automatic tuning mechanism 304 for signal conditioning. Subsequently, the conditioned video signal is routed to the network user's video monitor.

Figure 4:
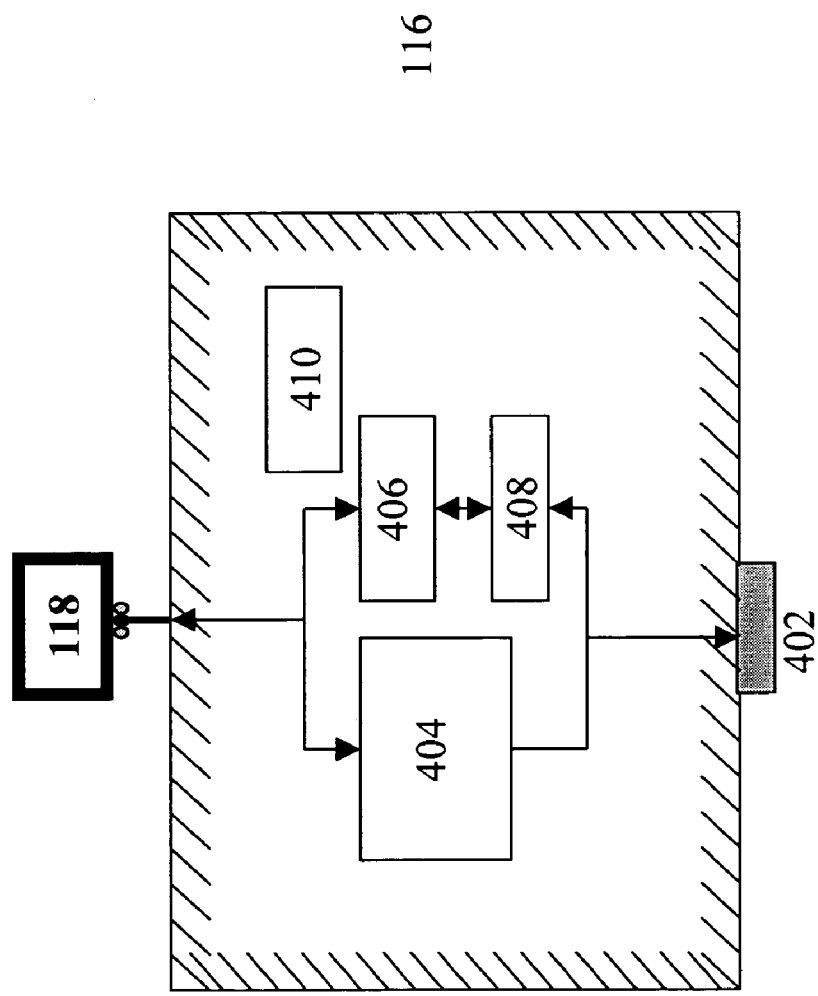
FIG. 4 is a schematic diagram depicting the computer interface module which connects the remotely located computer to the matrix switching unit through the single Category 5 UTP cable.

Turning next to FIG. 4, computer interface module (UKVM) 116 is provided to link the remotely located computer's 118 keyboard, video monitor and mouse signals to the intelligent, modular server management system. The computer interface module 116 is provided to convert the independent keyboard, video monitor and mouse signals to be transmitted via a single Category 5 UTP cable. The computer interface module 116 is compatible with all present day computer systems; however, it is foreseeable that the technology of the present invention will be compatible with those computer systems not yet contemplated. Specifically, the present invention provides access and control to a variety of computer platforms, including, but not limited to a PC, Mac, Sun, DEC, Alpha, RS/6000, HP9000, SGI, USB and ASCII devices.

Video signals are routed through the computer interface module in a unidirectional direction (i.e. from the remotely located computer 118 to the user station). Alternatively, keyboard and mouse signals are routed through the computer interface module in a bidirectional direction (i.e. from the remotely located computer 118 to the user station or from the user station to the remotely located computer 118). Keyboard and mouse signals routed from the remotely located computer 118 are transmitted to a UART 406. The UART 406 receives the signal and transfers the signal to a CPU 408. The CPU 408 receives the data and analyzes the signal attributes to determine the proper routing. Furthermore, the CPU 408 converts the signal to be routed via the single Category 5 UTP cable. The keyboard and mouse signals are routed from the CPU 408 through the Category 5 UTP cable port 402 to be transmitted via a single Category 5 UTP cable to the matrix switching unit.

Video signals are routed from the remotely located computer to the computer interface module 116. The video signals are transmitted through a video driver 404. The video driver 404 converts the standard Red, Green and Blue video signal to a differential signal to be transmitted via the single Category 5 UTP cable. Furthermore, the video driver 404 links the horizontal sync and the vertical sync of the signal to the standard Red, Green and Blue transmission allowing for the signal to be transmitted via a single Category 5 UTP cable.

In addition, the computer interface module 116 provides a memory unit 410. Specifically, the memory unit 410 stores the device name and status. Thus, if a specific remotely located computer 118 is not working properly, it is easy to assess which remotely located computer 118 is down. In addition, the memory unit provides a means for proper switching within the switching matrix unit since data corresponding to the location of the remotely located computer is transferred along with the data packet. Furthermore, all of the individual computers coupled to the intelligent, modular server system may be removed without losing the identification of the removed computer. For example, a remotely located computer may be turned off and removed. When the remotely located computer is replaced, the system will recognize the computer without any programming.

In the preferred embodiment, the remotely located computer 118 provides power to computer interface module 116. Thus, the need for additional power sources is reduced in the present invention.

Figure 5:
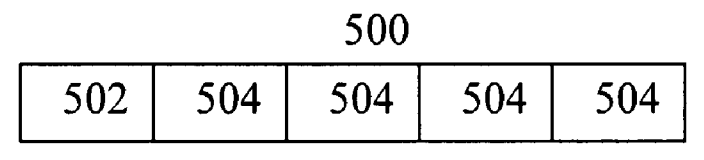

Referring next to FIG. 5, provided is an example of a data packet. In the example, a protocol data packet 500 consisting of a five byte transfer is depicted. The first byte 502 comprises the Command (CMD) data which provides information of the subsequent length of the data packet including the command information. Therefore, one byte carries both ½ command and ½ length. Subsequent bytes 504 provides the actual data transferred. It is well known in the art for CMD and length data to be transferred as separate bytes. Thus, the amount of data which is transferred in the example would be limited to a total of up to three bytes. However, by providing a protocol data packet that combines CMD and length data into one byte, the data packet can be shortened. Therefore, signal transmission in the intelligent, modular server management system disclosed is more efficient allowing for the use of a signal Category 5 UTP cable.

Figure 6:
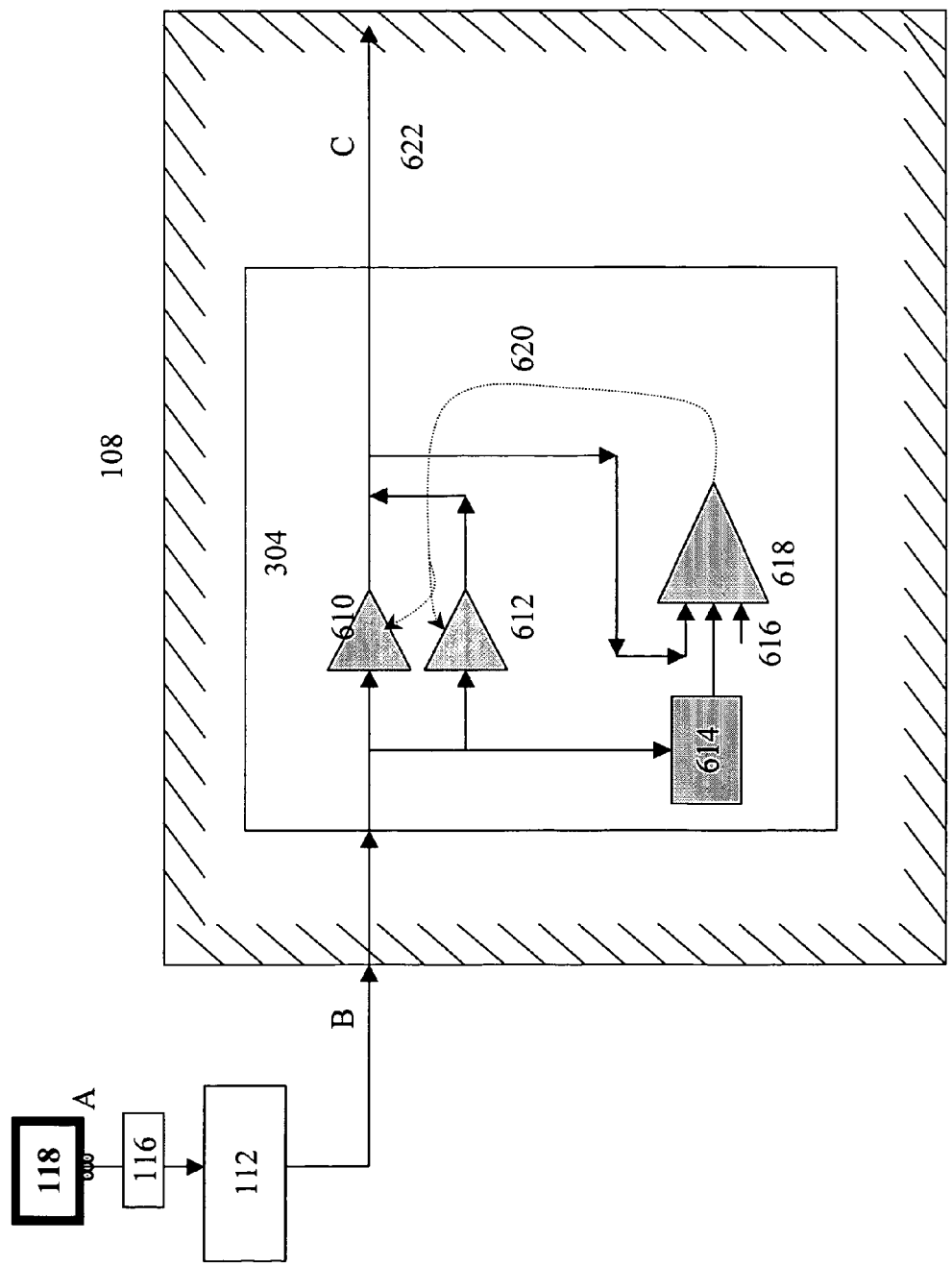
FIG. 6 is a schematic diagram representing the enhanced automatic tuning system of the preferred embodiment.

Referring next to FIG. 6 and FIG. 7 depicted is a block diagram representing the signal amplification and restoration (enhanced automatic tuning 304 of the user station 108) employed in the preferred embodiment (FIG. 6) and schematic diagrams representing signal distortion through the single Category 5 UTP cable at various points throughout the intelligent, modular server system (FIG. 7). In the preferred embodiment, the keyboard, video monitor and mouse signals from the remotely located computer 118 are transmitted via a single Category 5 UTP cable to the computer interface module 116. Depicted in FIG. 7A is an example of the wave signal which is routed from the remotely located computer 118 to the computer interface module 116. At this point of transmission, the wave signal is crisp demonstrating defined amplitude and frequency. The signal is then transmitted from the computer interface module 116 to the matrix switching unit 112. Depicted in FIG. 7B is an example of the wave signal which is routed from the computer interface module 116 to the matrix switching unit 112. At this point of transmission, the amplitude of the wave is greatly reduced and frequencies of the signal are attenuated, providing a poor transmitted signal. Subsequently, the signals are routed from the switching matrix unit 112 to the user station 108 wherein the video signal is conditioned by the enhanced automatic tuning mechanism 304. The signals, especially the video monitor signals (i.e. Red, Green and Blue), are degraded when transmitted over an extended range. Specifically, the amplitude of the signals is reduced and the high frequencies in the signaling are greatly attenuated. Such level of signaling loss is variable, depending on the cable type implemented and the cabling distance. Extending signaling over a Category 5 UTP cable generates noise which results in non-uniform signals at various distances. For example, the signal conditioning required at a distance of ten feet from an input point compared to the signal conditioning at a distance of two hundred feet or one thousand feet from an input point differs greatly. Therefore, to provide continuous signals over an extended range, a signal restoration system must be employed. To resolve the signal deformation that occurs, disclosed is an enhanced automatic tuning mechanism 304 which conditions the signals over the extended range. It is well known in the art that signal conditioning may be performed manually. However, it is desirable to achieve uniform signals over the extended range of the modular, intelligent server management system disclosed herein. Furthermore, each remotely located computer may be a few feet from the matrix switching unit while others may be several hundred feet or more. Subsequently, manually tuning would have to performed for each remotely located computer that is accessed. Therefore, an automatic tuning mechanism is desired which can automatically tune and take into account the diverse distances of each remotely located computer.

In one example of the enhanced tuning mechanism 304, the horizontal sync is carried by the Green video signal while the vertical sync is carried by the Blue video signal. However, it is known to one of ordinary skill in the art that several alternatives are available for the wiring configuration (i.e., horizontal sync carried by the Red video signal, vertical sync carried by the Blue video signal, . . . ). The horizontal and vertical syncs are carried as negative pulses since the video signals are positive pulses. To achieve the desired restoration of signals a precise impulse is injected along the horizontal sync providing a precise reference point for the enhanced automatic tuning system. Specifically, the horizontal sync is injected with a precise, known amplitude and precise square pulse signal shape. The raw blue signal with the superimposed vertical sync is routed to a slow peak detector 614. The slow peak detector 614 detects the amplitude of the vertical sync pulse. An automatic cable equalization circuit 618 within the enhanced automatic tuning system analyzes the amplitude of the received signal determined by the slow peak detector 614 and compares the amplitude of the received signal to the precise known amplitude and shape of the precise impulse 616. The automatic cable equalization circuit 618 then adjusts a variable gain amplifier 610 until the amplitude of the received signal is proportional to the known, precise impulse of the horizontal sync. In addition, the automatic cable equalization circuit 618 analyzes the "rising edge" of the received signal and adjusts a variable frequency compensation amplifier 612 until the signal wave shape of the received sync pulse is proportional to the signal wave shape of the known, precise impulse of the horizontal sync.

Further, the raw green video signal input from the Category 5 UTP cable, along with the superimposed horizontal sync, is routed through a variable gain amplifier 610 and a variable frequency compensation amplifier 612. The variable gain amplifier 610 and variable frequency compensation amplifier 612 perform the same adjustments to the raw green video signal as was completed on the raw blue video signal with the superimposed vertical sync.

Finally, the video signal is re-circulated through the automatic cable equalization circuit 618 until the signal is fully restored. The fully restored signal is then released back into the user station 104. Depicted in FIG. 7C is an example of the fully restored and conditioned signal which is routed through the user station 104.

Figure 8:
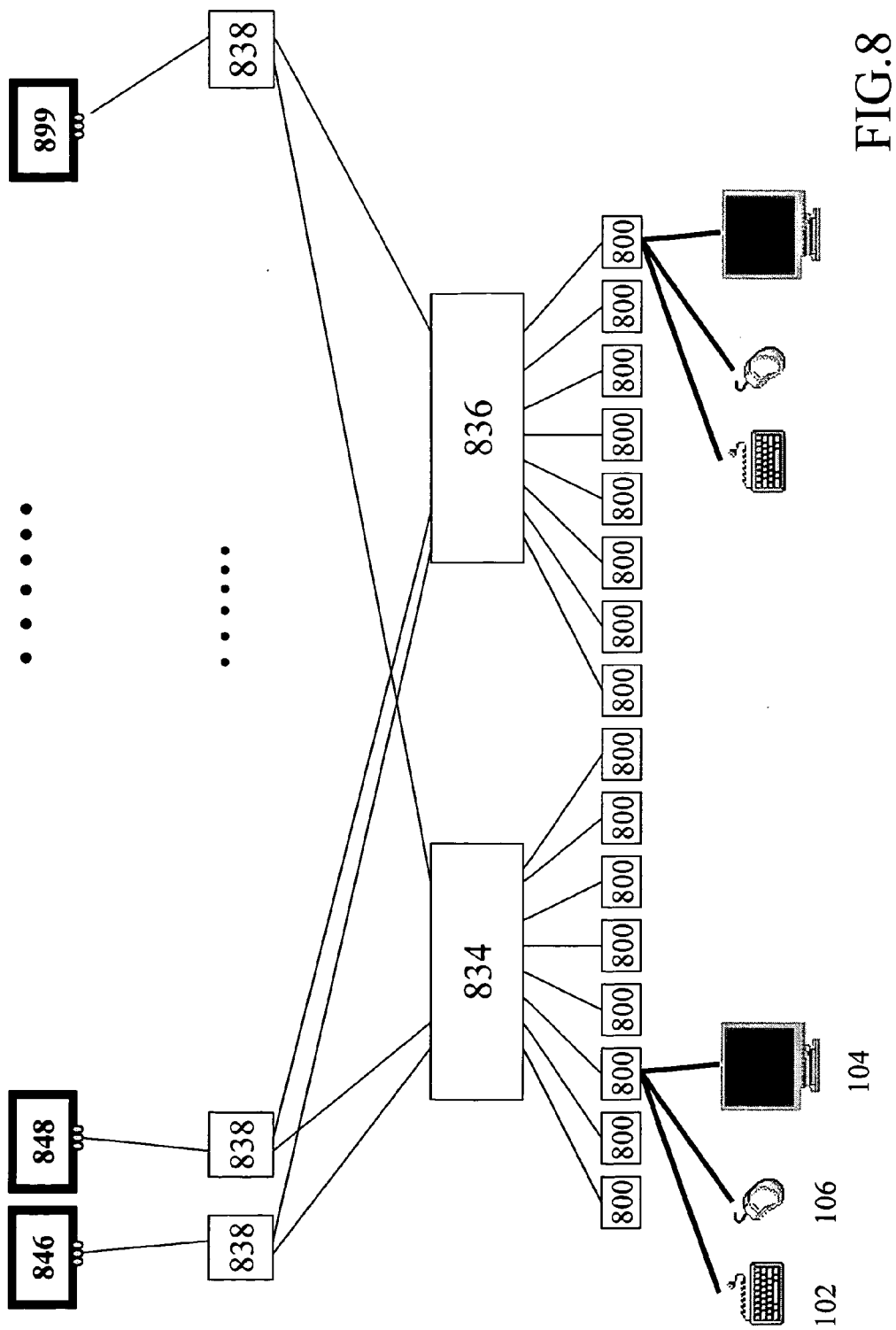
FIG. 8 is a pictorial diagram representing an alternative embodiment wherein a computer system may be expanded to allow for sixteen user stations to operate and access up to thirty two remotely located computers.

Referring next to FIG. 8, disclosed is one example of an alternative embodiment of the invention providing an expanded intelligent, modular server system. The use of two matrix switching units 834, 836 allows for expanding the intelligent, modular server system to sixteen network users and user stations 800 operating and accessing thirty two remotely located computers 846, 848, . . . 899. In this alternative embodiment, a keyboard 102, video monitor 104 and mouse 106 is coupled to a user station 800. Depending on the location of the user station 800, the user station 800 is linked to a first matrix switching unit 834 or a second matrix switching unit 836 via a single Category 5 UTP cable. The keyboard 102, video monitor 104 and mouse 106 signals are properly routed through the first matrix switching unit 834 or the second matrix switching unit 836 to a computer interface module 838. In this alternative embodiment, the computer interface module 838 provides for two Category 5 UTP cables interfaces connected to each of the matrix switching units 834, 836 employed. Thus, the computer interface module 838 provides an interface allowing for sixteen user station to operate thirty two remotely located computer 846, 848, . . . 899. In addition, this embodiment allows two user stations to access and operate the same remotely located computers 846, 868, . . . 899 at the same interval. Alternatively, this embodiment allows one user station 800 to inform a second user station 800 that a remotely located computer 846, 868, . . . 899 is in use and is therefore restricted.

Figure 9:
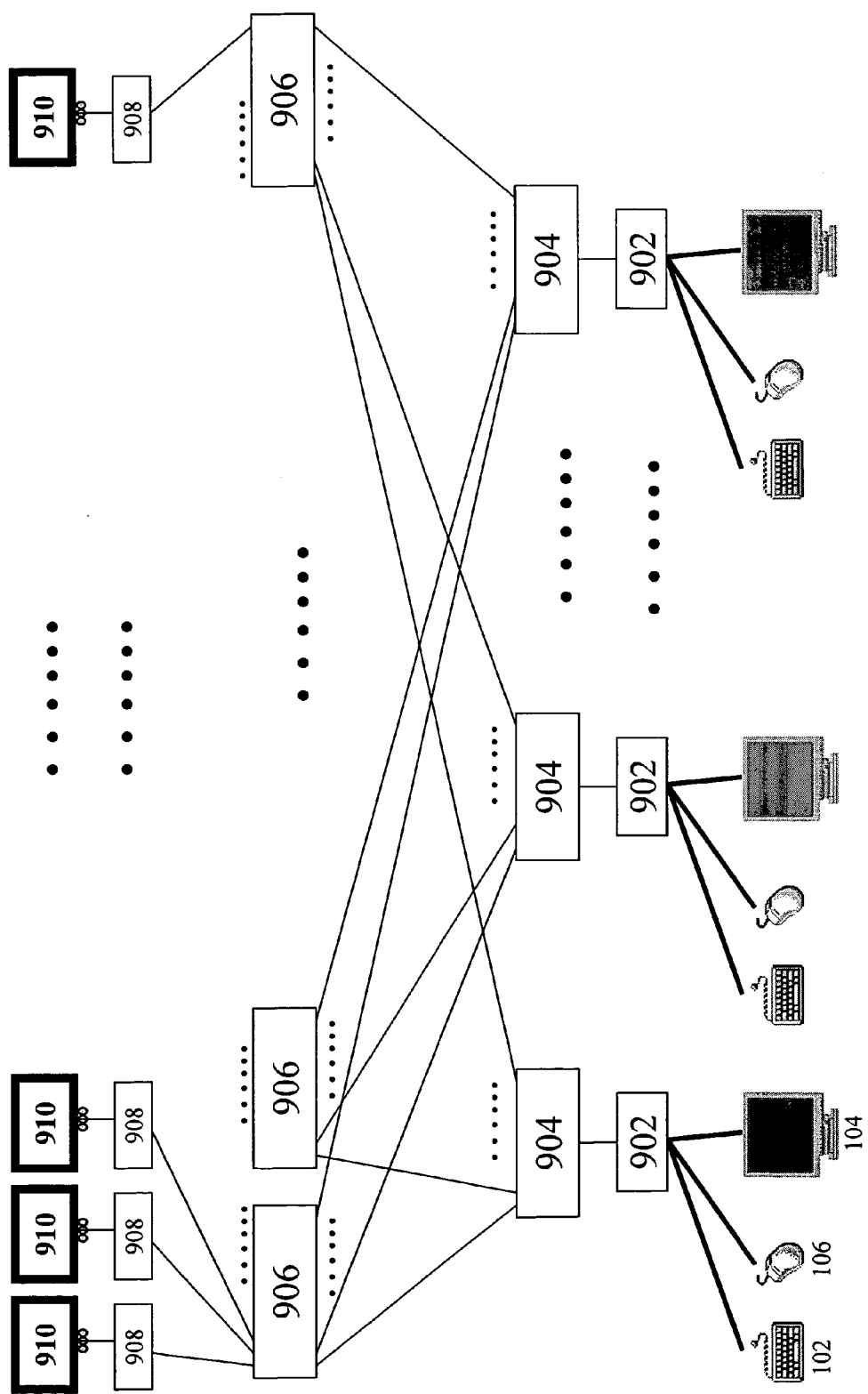
FIG. 9 is a pictorial diagram representing an alternative embodiment wherein a computer system may be expanded to allow for eight user stations to operate and access up to one thousand twenty four remotely located computers.

Referring next to FIG. 9, disclosed is one example of an alternative embodiment of the invention providing an expanded intelligent, modular server system. The use of eight matrix switching units 904 allows for expanding the intelligent, modular server system to eight network users and user stations 902 operating and accessing one thousand twenty four remotely located computers 910. In this alternative embodiment, a keyboard 102, video monitor 104 and mouse 106 is coupled to a user station 902. The user station 902 is directly linked to one of a series of first matrix switching units 904 via a single Category 5 UTP cable. The keyboard 102, video monitor 104 and mouse 106 signals are properly routed through the one of a series of first matrix switching units 904 to a second tier of matrix switching units 906 via a single Category 5 UTP cable. In this embodiment, the second tier of matrix switching units 906 comprises thirty two units. Each second tier matrix switching unit 906 is coupled to a computer interface module 908 which provides a direct interface to one of the one thousand twenty four remotely located computers 910 via a single Category 5 UTP cable.

Figure 10:
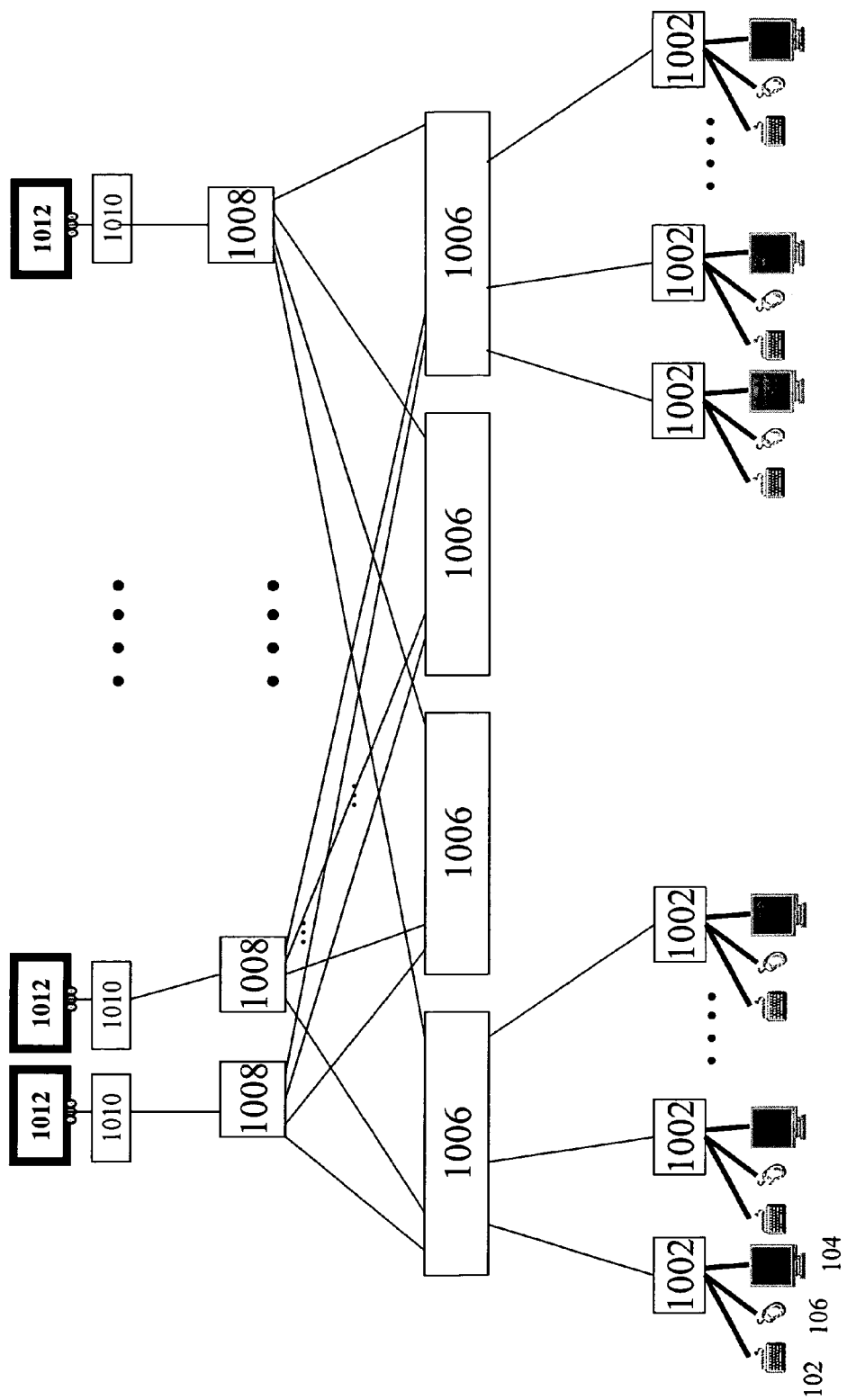
FIG. 10 is a pictorial diagram representing an alternative embodiment wherein a computer system may be expanded to allow for thirty two user stations to operate and access up to one thousand twenty four remotely located computers through the use of a Category 5 UTP cable hub system.

Referring next to FIG. 10, disclosed is one example of an alternative embodiment of the invention providing an expanded intelligent, modular server system. The use of thirty two matrix switching units 1006 allows for expanding the intelligent, modular server system to thirty two network users and user stations 1002 operating and accessing thirty two remotely located computers 1012. Although this pictorial diagram depicts access to thirty two remotely located computers 1012, the inventor has determined that this configuration operates effectively if expanded to a three tier system to provide thirty two user stations accessing two thousand forty eight remotely located computers. In this alternative embodiment, a keyboard 102, video monitor 104 and mouse 106 is coupled to a user station 1002. The user station 1002 is directly linked to one of a series of matrix switching units 1006 via a single Category 5 UTP cable. The matrix switching unit 1006 is coupled to a Category 5 UTP HUB 1008. In this embodiment, the Category 5 UTP HUB 1008 is provided to interface one single input Category 5 UTP cable to be expanded to allow for four single output Category 5 UTP cable. Therefore, in this alternative embodiment, the use of the Category 5 UTP cable HUBs 1008 allows for access to thirty two remotely located computers 1012. The Category 5 UTP cable HUB 1008 is coupled to a computer interface module 1008 which provides a direct interface to one of the thirty two remotely located computers 1012.

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

We claim:

1. A computer switching system comprising:
   a user interface device for multiplexing signals output from a connected keyboard and cursor control device and for providing an interface to a video display;
   a switch unit for enabling communication between said user interface device and a plurality of remotely located computers, said switch unit coupled to said user interface device by a single first connection; and
   a plurality of computer interface modules each coupled to said switch unit by a single second connection, each of said computer interface modules coupled to at least one of said remotely located computers;
   wherein video signals output from said remotely located computers are transmitted to said video display via said switch unit;
   wherein said user interface device comprises an amplification circuit for automatically amplifying said transmitted video signals based on analyzing at least an encoded synchronization signal having a predetermined signal characteristic transmitted with a component of said video signal and comparing said encoded synchronization signals to a signal of known shape to determine a degradation of said encoded synchronization signal;
   wherein said user interface device receives keyboard and cursor control device signals, packetizes at least one of said keyboard or cursor control signals and transmits said packetized signal with command data to said switch unit; and
   wherein said switch unit interprets said command data which identifies at least one of said remotely located computers, generates an emulated keyboard or cursor control device signal based on said packetized signal and transmits said emulated signal to said identified remotely located computer.

2. A system according to claim 1, wherein at least one of said first and second connections comprise a series of twisted pair conducting wires.

3. A system according to claim 2, wherein each said component of said video signals is transmitted on one of said twisted pair conducting wires and wherein said keyboard and cursor control device signals are transmitted on a separate one of said twisted pair conducting wires.

4. A system according to claim 2, wherein said encoded synchronization signal is transmitted with one of said components of said video signals on one of said twisted pair conducting wires.

5. A system according to claim 1, wherein said encoded synchronization signal is decoded by said user interface device.

6. A system according to claim 2, wherein said command data is transmitted with said keyboard and cursor control signals on a separate one of said twisted pair conducting wires.

7. A system according to claim 1, wherein each of said plurality of computer interface modules receives power from one of said remote computers.

8. A system according to claim 1, wherein said amplification circuit amplifies amplitude and frequency components of said video signals by analyzing said encoded synchronization signal.

9. A system according to claim 1, wherein said encoded synchronization signal is horizontal or vertical synchronization signal.

10. A computer switching system comprising:
    a user station including a keyboard, cursor control device and video display;
    a switch for enabling communication between said user station and a plurality of remotely located computers, wherein said switch is coupled to said user station by a first connection; and
    a plurality of computer interface modules each coupled to a communication circuit of one of said plurality of remote computers and each of said computer interface modules coupled to said switch by a second connection;
    wherein said user station receives keyboard and cursor control device signals, packetizes at least one of said keyboard or cursor control device signals, and transmits said packet with command data to said switch;
    wherein said switch interprets said command data in said packet to determine a destination of said packet, emulates keyboard or cursor control device signals, and transmits said emulated keyboard or cursor control device signal to said destination;
    wherein one of said computer interface modules receives video signals having red, green, and blue components from one of said remote computers and encodes synchronization signals onto at least one of said components for transmission to said user station through said switch; and
    wherein said user station analyzes said encoded synchronization signals having a predetermined signal characteristic to automatically amplify one or more frequency components of said video signals and compares said encoded synchronization signals to a signal of known shape to determine a degradation of said encoded synchronization signals.

11. A system according to claim 10, wherein each of said computer interface modules receives power from one of said remotely located computers.

12. A system according to claim 10, wherein at least one of said first and second connections comprise a series of twisted pair conducting wires.

13. A system according to claim 12, wherein each said component of said video signals is transmitted on one of said twisted pair conducting wires and wherein said keyboard and cursor control device signals are transmitted on a separate one of said twisting pair conducting wires.

14. A system according to claim 10, wherein said encoded synchronization signals are encoded as negative signals.

15. A system according to claim 10, wherein said encoded synchronization signals comprise horizontal or vertical synchronization signals.

16. A system according to claim 10, wherein said user station amplifies said one or more frequency components of said video signals to compensate for said degradation.

17. A method for remotely operating a remote computer, said method comprising the steps of:
    receiving keyboard signals from a local keyboard at a user station;

receiving cursor control device signals from a local cursor control device at said user station;

transmitting said keyboard and cursor control device signals with command data to a central switch;

interpreting said command data and said keyboard and cursor control device signals, said central switch including a circuit for producing emulated keyboard and cursor control device signals at said central switch;

transmitting said emulated keyboard and cursor control device signals to said remote computer;

receiving video signals at said central switch from said remote computer in response to said emulated keyboard and cursor control device signals;

amplifying at least one frequency component of said video signals based on analyzing encoded synchronization signals having a predetermined characteristic signal transmitted with said video signals to produce tuned video signals for display at said user station; and comparing said encoded synchronization signals to a signal of known shape to determine a degradation of said encoded synchronization signals.

18. A method according to claim 17, said method further comprising the step of:

encoding said synchronization signals onto said video signals from said remote computer.

19. A method according to claim 17, further comprising the step of:

analyzing said encoded synchronization signals to determine a level of amplification for said at least one frequency component of said video signals.

20. A method according to claim 17, wherein said encoded synchronization signals comprise horizontal or vertical synchronization signals.

* * * * *